United States Patent [19]
Justice et al.

[11] Patent Number: 5,435,792
[45] Date of Patent: Jul. 25, 1995

[54] MULTIPLE-SPEED AUTOMATIC TRANSMISSION FOR MOTOR VEHICLES

[75] Inventors: Clinton F Justice; Stanley L. Pierce, both of Northville, Mich.

[73] Assignee: Ford Motor Company, Dearborn, Mich.

[21] Appl. No.: 218,410

[22] Filed: Mar. 28, 1994

[51] Int. Cl.⁶ .............................................. F16H 57/10
[52] U.S. Cl. ....................... 475/276; 475/275; 475/279; 475/281
[58] Field of Search ............. 475/275, 276, 280, 281, 475/286, 287, 290, 291, 279

[56] References Cited

U.S. PATENT DOCUMENTS

| | | |
|---|---|---|
| 4,368,649 | 1/1983 | Vahratian et al. ................ 475/276 |
| 5,069,656 | 12/1991 | Sherman ......................... 475/276 |
| 5,129,871 | 7/1992 | Sandel et al. .................... 475/281 X |
| 5,230,671 | 7/1993 | Michiolca et al. . |
| 5,250,011 | 10/1993 | Pierce . |
| 5,261,862 | 11/1993 | Pierce ............................ 475/276 X |
| 5,295,924 | 3/1994 | Beim .............................. 475/275 |

*Primary Examiner*—Charles A. Marmor
*Assistant Examiner*—Peter Kwon
*Attorney, Agent, or Firm*—Frank G. McKenzie; Roger L. May

[57] ABSTRACT

A multiple-speed transmission for use in an automotive vehicle driveline includes a torque converter, three simple planetary gear units, one-way clutches and brakes, friction clutches, and friction brakes. The engaged and disengaged state of the friction elements permit the transmission to produce several underdrive speed ratios, a direct drive ratio, and several overdrive ratios.

11 Claims, 2 Drawing Sheets

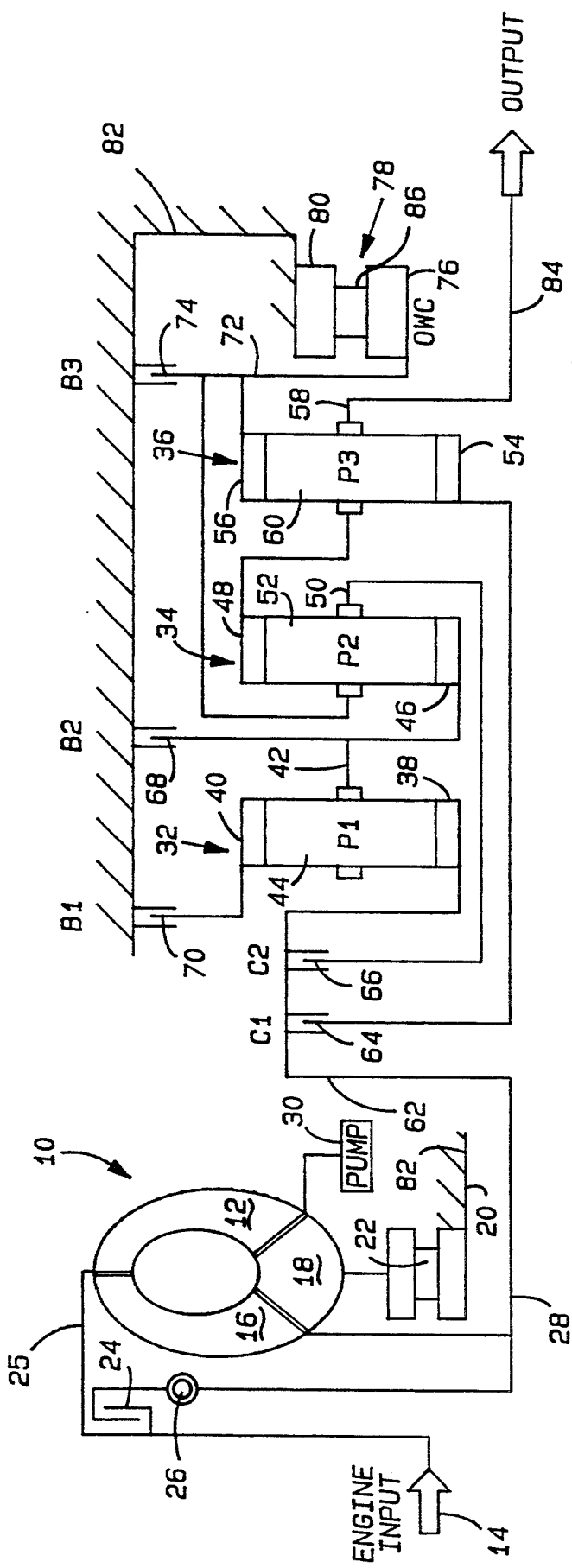

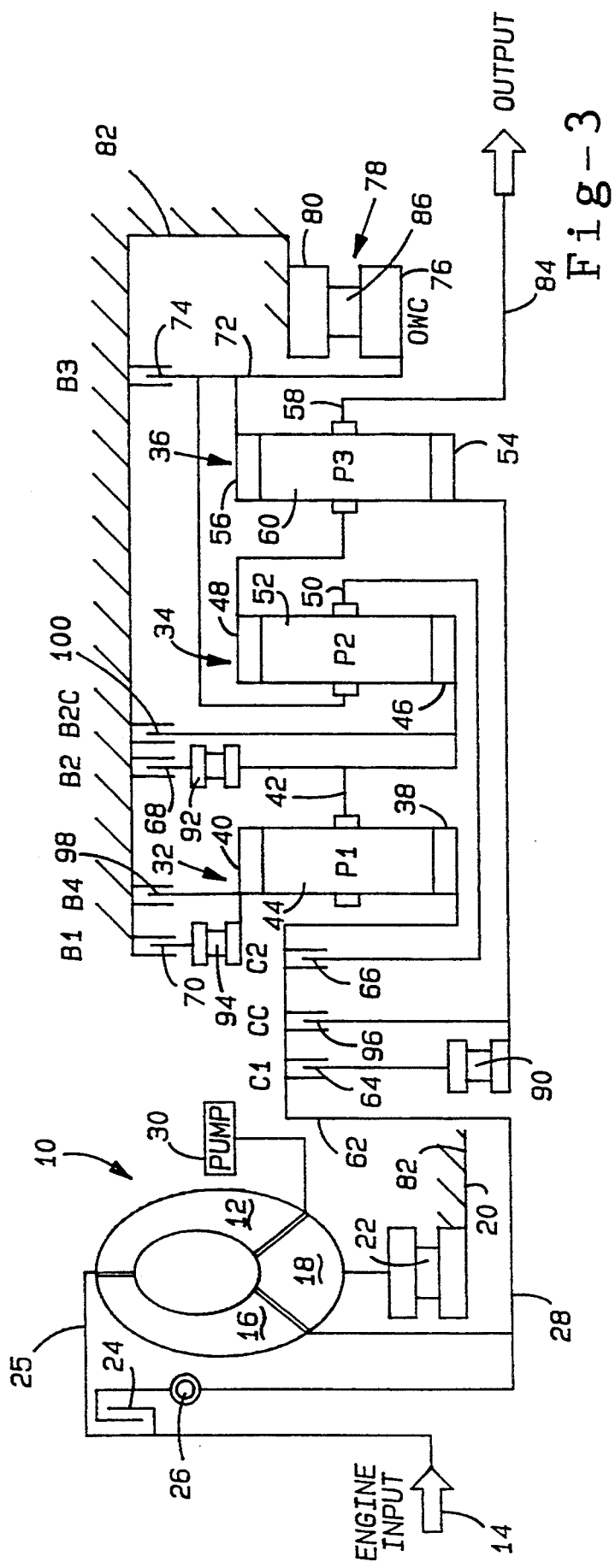

MULTIPLE-SPEED AUTOMATIC TRANSMISSION FOR MOTOR VEHICLES

BACKGROUND OF THE INVENTION

1. Field of the Invention

This invention relates to the field of automatic transmissions for motor vehicles. More particularly, the invention pertains to the kinematic arrangement of planetary gearing, clutches, brakes, and overrunning couplings for such transmissions.

2. Description of the Prior Art

It is important to minimize the package size of a motor vehicle automatic transmission, its transverse or lateral dimensions, but particularly its longitudinal or axial dimension, in order to provide as much space as possible for passengers and other equipment on the vehicle. Generally, compact transmissions have lower weight than other types, an important advantage toward maximizing fuel economy of the vehicle. U.S. Pat. Nos. 5,250,011 and 5,230,671 describe examples of transmissions of this type.

These desirable features are more difficult to realize now than formerly because of the need to provide a greater number of forward gear ratios and a desire to provide nonsynchronous shifting among the gears. Currently, automatic gransmissions have four or five forward speed ratios, but in the near future these transmissions will provide nonsynchronous shifting among five and six forward gears.

SUMMARY OF THE INVENTION

This invention is an automatic transmission capable of producing six forward speed ratios and a reverse drive ratio. The six forward speed ratios include three underdrive ratios, a direct drive, and two overdrive ratios.

For synchronous operation, the kinematic arrangement includes two hydraulically-actuated friction clutches, one overrunning coupling, three hydraulically-actuated friction brakes, and three integrated simple planetary gear units. The synchronous power flow uses nonsynchronous 1-2, 2-1 gear ratio changes.

The nonsynchronous kinematic arrangement includes three integrated simple planetary gear units, four overrunning couplings for five-speed ratio operations, five overrunning couplings for six-speed ratio operation, three friction clutches, and four friction brakes.

The automatic transmission according to the present invention includes an input shaft; an output shaft; a nonrotating member; a planetary gear system comprising first, second and third planetary gear units, each gear unit having a sun gear, a ring gear, planet pinions meshing with the sun gear and ring gear, and a carrier rotatably supporting the planet pinions, the output shaft connected drivably to the ring gear of the second gear unit and carrier of the third gear unit, the carrier of the second gear unit and ring gear of the third gear unit mutually connected and drivably connectable to the nonrotating member, the carrier of the first gear unit and sun gear of the second gear unit mutually connected and drivably connectable to the nonrotating member, the sun gear of the first gear unit drivably connected to the input shaft, the sun gear of the third gear unit and carrier of the second gear unit connectable drivably to the input shaft; first brake means for holding against rotation and releasing the ring gear of the first gear unit; second brake means for holding against rotation and releasing the sun gear of the second gear unit and carrier of the first gear unit; third brake means for holding against rotation and releasing the carrier of the second gear unit and ring gear of the third gear unit; first clutch means for drivably connecting and disconnecting the sun gear of the third gear unit and input shaft; and second clutch means for drivably connecting and disconnecting the carrier of the second gear unit and input shaft.

BRIEF DESCRIPTION OF THE DRAWINGS

FIG. 1 is a schematic diagram of the kinematic arrangement of the gears, clutches, brakes, and couplings for a preferred embodiment of this invention.

FIG. 2 is a chart that shows the pattern of engagement and release of the clutches, brakes, and couplings required to produce the various forward drive ratios and reverse ratio for the transmission mechanism of FIG. 1.

FIG. 3 is a schematic diagram of the kinematic arrangement of an alternate embodiment of the automatic transmission of this invention.

FIG. 4 is a chart that shows the pattern of engagement and release of the clutches, brakes, and couplings required to establish the forward drive and reverse drive ratios of the transmission mechanism of FIG. 3.

DESCRIPTION OF THE PREFERRED EMBODIMENT

Referring first to FIG. 1, a hydrokinetic torque converter 10 includes an impeller 12 connected to the crankshaft 14 of an internal combustion engine, a bladed turbine 16, and a bladed stator 18. The impeller and turbine wheels define a toroidal fluid flow circuit, whereby the impeller is hydrokinetically connected to the turbine. The stator 18 is supported rotatably on a stationary stator sleeve shaft 20, and an overrunning brake 70 anchors the stator to the shaft 20 to prevent rotation of the stator in a direction opposite the direction of rotation of the impeller, although free-wheeling motion in the opposite direction is permitted.

The torque converter assembly includes a lockup clutch 24 located within the torque converter impeller housing 25. The torque output side of lockup clutch 24 includes a damper 26 located between the impeller and the turbine shaft, which is the transmission input shaft 28. When clutch 24 is engaged, the turbine and impeller are mechanically connected; when clutch 24 is disengaged, they are hydrokinetically connected and mechanically disconnected. The damper absorbs transitory torque fluctuations associated with engagement of a lockup clutch. Fluid to the torque converter is supplied from the output of an oil pump assembly 30.

Planetary gearing includes first, second, and third planetary gear units 32, 34, and 36. The first gear unit 32 includes a sun gear 38, ring gear 40, carrier 42, and planetary pinions 44, supported by carrier 30 in meshing engagement with sun gear 38 and ring gear 40. The second gear unit 34 includes a sun gear 46, ring gear 48, carrier 50, and planetary pinions 52, rotatably supported on carrier 50 in meshing engagement with sun gear 46 and ring gear 48. A third gear unit 36 includes a sun gear 54, ring gear 56, carrier 58, and planetary pinions 60 rotatably supported on carrier 58 in meshing engagement with sun gear 54 and ring gear 46.

Sun gear 38 is continually drivably connected by member 62 to input shaft 28; clutch 64 connects and releases the input shaft and sun gear 54; clutch 66 connects and releases the input shaft and carrier 50.

Sun gear 46 and carrier 42 are mutually drivably connected, and they are held against rotation and released through operation of brake 68. Brake 70 holds against rotation and releases alternately ring gear 40 of the first planetary gear unit 32. Carrier 50 of the second gear unit 34 is continually drivably connected to ring gear 56 of third gear unit 36 and, by way of member 72, to a third friction brake 74, which holds against rotation and releases alternately carrier 50, ring gear 56, and one of the races 76 of an overrunning coupling 78. The other race 80 of coupling 78 is fixed against rotation on the transmission housing 82, which provides a nonrotating member on which a torque reaction is provided through brakes 68, 70, 74, and by which shaft 20 is held against rotation.

Ring gear 48 of the second gear unit and carrier 58 of the third gear unit mutually drivably connect, and they are connected also to output shaft 84, which is drivably connected to the spindle of a differential mechanism through which power is transmitted to the drive wheels of a vehicle, as described and illustrated in U.S. Pat. No. 5,261,862.

Clutches 64, 66, and brakes 68, 70, 74, are hydraulically-actuated friction elements. Overrunning coupling 78 produces a one-way drive connection between the transmission casing 82 and race 76 due to engagement of the roller or sprag element 86 located between the races.

FIG. 2 is a chart indicating the clutches, brakes, and couplings that are engaged and released selectively to produce each of the gear ratios. In the chart, symbol "X" identifies an engaged friction clutch or friction brake and torque transfer through coupling 78. The symbol "O/R" indicates an overrunning condition for coupling 78. The symbol "N/A" indicates that coupling 78 is neither overrunning nor driving. A blank indicates that the corresponding clutch and brake is disengaged or released.

The gear selector lever controlled by the vehicle operator to select the operating range of the transmission is movable among positions where the various gear ratios are produced automatically and other positions where the gear ratios are produced manually. Operation of the kinematic components of the transmission is described next with reference to the state of the friction elements and the coupling and each of the gear ratios.

When the transmission operates in the first gear ratio, forward clutch 64 is engaged and coupling 78 drives, thereby holding ring gear 56 against rotation on the transmission casing 82. The first speed ratio is produced in the third gear unit 36 and the output is taken at carrier 58, which drives output shaft 84.

In the M/LOW range, brake 74 is engaged to replace, during coast conditions, the torque reaction provided by coupling 78, during drive conditions. Therefore, by maintaining ring gear 56 held against rotation, engine braking is available while coasting in the manual low range.

An upshift to the second speed ratio results by maintaining engaged forward clutch 64 and engaging brake 68. In this way, sun gear 54 of the third gear unit 36 is connected to input shaft 28. Ring gear 48 of the second gear unit 34 is held against rotation on the housing 82, and the output is taken at carrier 58 and output shaft 84.

An upshift to the third speed ratio from the second speed ratio requires disengagement of brake 68 and application of brake 70 while maintaining the forward clutch applied. Sun gear 38 of the first gear unit 32 is driven directly from the input shaft 28, and sun gear 40 is held against rotation; therefore, the speed of carrier 42 and sun gear 46 is established. Sun gear 54 of the third gear unit is driven through clutch 64 from the input shaft 28; therefore, the speed of ring gear 48, carrier 58, and output shaft 84 is determined.

A fourth forward speed ratio is produced by maintaining forward clutch 64 engaged, applying clutch 62, and releasing the other friction elements. Sun gear 38, carrier 50, and sun gear 54 are driven at the speed of input shaft 28 through member 62, clutch 66, and clutch 64, respectively; therefore, the carrier and ring gear of the second gear unit 34, and the sun gear, ring gear, and carrier of the third gear unit 36, are locked up, rotate at the speed of the input shaft, and drive output shaft 84 at that speed.

The fifth speed ratio is produced when clutch 66 and brake 70 are engaged and the other friction elements are disengaged. This action drives sun gear 38 at the speed of input shaft 28, holds sun gear 40 fixed against the transmission casing 82 through brake 70, and establishes the speed of carrier 42 and ring gear 46. Carrier 50 is also driven at the speed of the input shaft through operation of clutch 66; therefore, the speed and torque output of ring gear 48, carrier 58, and output shaft 84 are established.

The sixth forward speed ratio results when clutch 66 is applied, brake 68 is engaged, and the other friction elements are disengaged. This action drives carrier 50 of the second gear unit at the speed of input shaft 28 through clutch 66, holds ring gear 46 of that gear unit fixed against rotation through operation of brake 68, and establishes the speed and torque of ring gear 48, carrier 50, and output shaft 84.

Reverse drive results by engaging brakes 70 and 74, and releasing the other friction elements. This action holds ring gear 40 against rotation on the transmission housing, drives sun gear 38 at the speed of input shaft 28, and establishes the speed of the output of first gear unit 32, carrier 42, and ring gear 46. Carrier 50 of the second gear unit 34 is held against rotation on the housing 82 through operation of brake 74; therefore, the speed and torque of ring gear 48, carrier 58, and the output shaft 84 are established.

In FIG. 3, the various components on the transmission are marked with the same reference numbers as those of FIG. 1, and additional components have been added to provide synchronous gear shifts among the various gear ratios.

An overrunning coupling 90, arranged in series with friction clutch 64 between member 62 and sun gear 54, produces a one-way drive connection. A third one-way coupling 92, arranged in series with brake 68 between carrier 42, ring gear 48, and the transmission casing 82, produces a one-way drive connection. A fourth overrunning coupling 94, arranged in series with brake 70 between ring gear 40 and the transmission casing, produces a one-way drive connection.

Coast clutch 96, arranged in parallel with the series arrangement of clutch 64 and coupling 90, alternately connects and releases input shaft 28 and sun gear 54 of the third gear unit 36.

A fourth brake 98, arranged in parallel with brake 70 and coupling 94 between ring gear 40 and housing 82, alternately holds against rotation and releases sun gear 40 during coast conditions in the third forward speed ratio and first drive ratio. A second-gear coast brake 100 alternately holds sun gear 46 against rotation on housing 82 and releases that connection.

FIG. 4 sets forth the schedule of engaged and released states of the friction clutches and brakes, and the driving and overrunning conditions of the couplings. The description that follows describes operation of the transmission of FIG. 3, and each of the forward drive ratios with reference to the schedule of FIG. 4. Coast condition engagement is indicated by "C".

To produce the first speed ratio, clutch 64 is engaged, and coupling 90 drivably connects input shaft 28 and sun gear 54 through clutch 64. Ring gear 56 is held against rotation on the housing by the torque transmitted through coupling 78, and the output is taken at output shaft 64 during a coast condition due to the engagement of coast clutch 96. Engine braking is provided because that clutch produces a torque delivery path between sun gear 54 and input shaft 28, even though coupling 90 overruns, and brake 74 is engaged during coast conditions to provide the torque reaction at ring gear 56.

In the second speed ratio, sun gear 54 is drivably connected through first coupling 90 and forward clutch 64 to the input shaft 28, sun gear 46 is held against rotation through the torque delivery path that includes third coupling 92 and second brake 68, and the output is taken at carrier 58 and shaft 84. Engine braking is available during coast conditions due to the torque delivered through coast clutch 96. Coupling 90 overruns, and brake 100 is engaged during coast conditions to provide a torque reaction at sun gear 46.

A nonsynchronous upshift to the third gear from the second gear results when first brake 70 is applied in addition to brakes 68 and forward clutch 64. This action causes sun gear 54 to be driven from the input shaft through clutches 64 and coupling 90. Ring gear 40 is held against rotation through operation of brake 70 and coupling 94; therefore, the speed and torque carried by carrier 42 as the output for the first planetary gear unit 42 is determined and applied to sun gear 46 of the second planetary gear unit. During coast conditions, couplings 90 and 94 overrun. A torque delivery path between sun gear 54 and input shaft 28 is provided by engagement of coast clutch 96; a torque delivery path between housing 82 and ring gear 40 is provided by engagement of brake 98. Therefore, engine braking is available during coast conditions in the third speed ratio.

To produce a nonsynchronous upshift from the third gear ratio to the fourth gear ratio, clutch 66 is engaged. This action causes couplings 78, 92, and 94 to overrun and coupling 92 to drive. In the fourth speed ratio, sun gear 54 is drivably connected through coupling 90 and clutch 64 to the input shaft 28, and sun gear 38 is connected directly to the input shaft 28. Carrier 50 and ring gear 56 are drivably connected to the input shaft through clutch 66; therefore, third gear unit 36 is locked-up and the output is taken at carrier 58, which drives output shaft 84 at the same speed as the input shaft 28.

Although coupling 90 overruns during coast conditions, clutch 96 maintains a connection between sun gear 54 and input shaft 28. Therefore, engine braking is available under coast conditions.

An upshift to the fifth speed ratio results by applying brake 98 and releasing coast clutch 96. This action causes the four couplings to overrun, drivably connects ring gear 38 and input shaft 28, and drivably connects carrier 50 and ring gear 56 to the input shaft 28. Ring gear 40 is held against rotation on the transmission housing through brake 98, and the output of the first gear unit 32 is taken at carrier 42, which drives sun gear 46 of the second gear unit at the same speed. The output is taken at ring gear 48, carrier 58, and output shaft 84.

Reverse drive results by engaging brakes 70 and 74, releasing the other friction element, and applying brake 98 during coast conditions. This action causes coupling 94 to drive, and causes couplings 78, 90, and 92 to transmit no torque. Therefore, ring gear 40 is held against rotation on the transmission housing through coupling 94 and brake 70, and the output of the first gear unit, carrier 42, drives sun gear 46. Carrier 50 of the second gear unit and ring gear 56 of the third gear unit are held on transmission housing 82 against rotation due to engagement of brake 74. The output is taken at ring gear 48, carrier 58, and output shaft 84 during a coast condition when coupling 94 overruns; therefore, engine braking is available in the reverse drive condition.

Although coupling 94 overruns under coast conditions, brake 98, which is engaged in the reverse range while coasting, maintains ring gear 40 held against rotation and provides a torque reaction on the housing 82.

Having described a preferred embodiment of our invention, what we claim and desire to secure by U.S. Letters Patent is:

1. A multiple-speed ratio automatic transmission for an automotive vehicle, comprising:

an input shaft;

output shaft;

an nonrotating member;

a planetary gear system comprising first, second and third planetary gear units, each gear unit having a sun gear, a ring gear, planet pinions meshing with the sun gear and ring gear, and a carrier rotatably supporting the planet pinions, the output shaft connected drivably to the ring gear of the second gear unit and carrier of the third gear unit, the carrier of the second gear unit and ring gear of the third gear unit mutually connected and drivably connectable to the nonrotating member, the carrier of the first gear unit and sun gear of the second gear unit mutually connected and drivably connectable to the nonrotating member, the sun gear of the first gear unit drivably connected to the input shaft, the sun gear of the third gear unit and carrier of the second gear unit connectable drivably to the input shaft;

first brake means for holding against rotation and releasing the ring gear of the first gear unit;

second brake means for holding against rotation and releasing the sun gear of the second gear unit and carrier of the first gear unit;

third brake means for holding against rotation and releasing the carrier of the second gear unit and ring gear of the third gear unit;

first clutch means for drivably connecting and disconnecting the sun gear of the third gear unit and input shaft; and second clutch means for drivably connecting and disconnecting the carrier of the second gear unit and input shaft.

2. The transmission of claim 1, wherein the third brake means comprises:

a friction brake having a first element drivably connected to the carrier of the second gear unit and ring gear of the third gear unit, and a second element connected to the nonrotating member; and overrunning coupling means arranged in parallel drive relationship with said friction brake for producing a one-way drive connection between the nonrotating member and the carrier of the second gear unit and ring gear of the third gear unit.

3. The transmission of claim 1, further comprising:
a torque converter having an impeller drivably connected to the power source; and
a turbine hydrokinetically coupled to the impeller and drivably connected to the input shaft.

4. An automatic transmission for an automotive vehicle, comprising:
an input shaft;
an output shaft;
a nonrotating member;
a planetary gear system comprising first, second and third planetary gear units, each gear unit having a sun gear, a ring gear, planet pinions meshing with the sun gear and ring gear, and a carrier rotatably supporting the planet pinions, the output shaft connected drivably to the ring gear of the second gear unit and carrier of the third gear unit, the carrier of the second gear unit and ring gear of the third gear unit mutually connected and drivably connectable to the nonrotating member, the carrier of the first gear unit and sun gear of the second gear unit mutually connected and drivably connectable to the nonrotating member, the sun gear of the first gear unit drivably connected to the input shaft, the sun gear of the third gear unit and carrier of the second gear unit connectable drivably to the input shaft;
first brake means for producing a one-way drive connection between the nonrotating member and ring gear of the first gear unit, and for holding against rotation and releasing said ring gear;
second brake means for producing a one-way drive connection between the nonrotating member and the carrier of the first gear unit andسun gear of the second gear unit, and for holding against rotation and releasing said carrier and sun gear;
third brake means for producing a one-way drive connection of the nonrotating member to the carrier of the second gear unit and ring gear of the third gear unit, and for holding against rotation and releasing said carrier and ring gear;
first clutch means for drivably connecting and disconnecting the sun gear of the third gear unit and input shaft;
second clutch means for drivably connecting and disconnecting the carrier of the second gear unit and input shaft; and
third clutch means for drivably connecting and disconnecting the sun gear of the third gear unit and input shaft.

5. The transmission of claim 4, wherein the first brake means comprises:
a first brake located in a torque delivery path between the ring gear of the first gear unit and nonrotating member;
first overrunning coupling means arranged in series with the first brake for producing a one-way drive connection between the ring gear of the first gear unit and nonrotating member; and
second brake arranged in parallel with the first brake and first overrunning coupling means arranged.

6. The transmission of claim 4, wherein the second brake means comprises:
a third brake located in a torque delivery path between the carrier of the first gear unit and sun gear of the second gear unit and the nonrotating member;
second overrunning coupling means arranged in series with the third brake for producing a one-way drive connection between the carrier of the first gear unit and sun gear of the second gear unit and the nonrotating member.

7. The transmission of claim 4, wherein the third brake means comprises:
a fourth brake located in a torque delivery path between the nonrotating member and the carrier of the second gear unit and ring gear of the third gear unit; and
third overrunning coupling means arranged in parallel with the third brake for producing a one-way drive connection between the carrier of the second gear unit and ring gear of the third gear unit and the nonrotating member.

8. The transmission of claim 4, wherein the first clutch means comprises:
a first clutch; and
fourth overrunning coupling means arranged in series with the first clutch, said fourth overrunning coupling and first clutch located in a torque delivery path between the input shaft and sun gear of the third gear unit.

9. The transmission of claim 4, wherein the third clutch means comprises:
a third friction clutch located in a torque delivery path between the input shaft and sun gear of the third gear unit, the third clutch arranged in parallel with the first clutch and fourth overrunning coupling.

10. The transmission of claim 4, further comprising:
a torque converter having an impeller drivably connected to the power source; and
a turbine hydrokinetically coupled to the impeller and drivably connected to the input shaft.

11. An automatic transmission for an automotive vehicle, comprising:
an input shaft;
an output shaft;
a nonrotating member;
a planetary gear system comprising first, second and third planetary gear units, each gear unit having a sun gear, a ring gear, planet pinions meshing with the sun gear and ring gear, and a carrier rotatably supporting the planet pinions, the output shaft connected drivably to the ring gear of the second gear unit and carrier of the third gear unit, the carrier of the second gear unit and ring gear of the third gear unit mutually connected and drivably connectable to the nonrotating member, the carrier of the first gear unit and sun gear of the second gear unit mutually connected and drivably connectable to the nonrotating member, the sun gear of the first gear unit drivably connected to the input shaft, the sun gear of the third gear unit and carrier of the second gear unit connectable drivably to the input shaft;
first brake means for producing a one-way drive connection between the nonrotating member and ring gear of the first gear unit and for holding against rotation and releasing said ring gear, including a first brake located in a torque delivery path btween the ring gear of the first gear unit and nonrotating member; first overrunning coupling means arranged in series with the first brake for producing a one-way drive connection between the ring gear of the first gear unit and nonrotating member; and second brake arranged in parallel with the first brake and first overrunning coupling means;

second brake means for producing a one-way drive connection between the nonrotating member and the carrier of the first gear unit and sun gear of the second gear unit, and for holding against rotation and releasing said carrier and sun gear,
including a third brake located in a torque delivery path between the carrier of the first gear unit and sun gear of the second gear unit and the nonrotating member, second overrunning coupling means arranged in series with the third brake for producing a one-way drive connection between the carrier of the first gear unit and sun gear of the second gear unit and the nonrotating member;

third brake means for producing a one-way drive connection of the nonrotating member to the carrier of the second gear unit and ring gear of the third gear unit, and for holding against rotation and releasing said carrier and ring gear,
including a fourth brake located in a torque delivery path between the nonrotating member and the carrier of the second gear unit and ring gear of the third gear unit, and third overrunning coupling means arranged in parallel with the fourth brake for producing a one-way drive connection between the carrier of the second gear unit and ring gear of the third gear unit and the nonrotating member;

first clutch means comprises:

first clutch means for drivably connecting and disconnecting the sun gear of the third gear unit and input shaft,
including a first clutch, fourth overrunning coupling means arranged in series with the first clutch, said fourth overrunning coupling and first clutch located in a torque delivery path between the input shaft and sun gear of the third gear unit;

second clutch means for drivably connecting and disconnecting the carrier of the second gear unit and input shaft; and third clutch means for drivably connecting and disconnecting the sun gear of the third gear unit and input shaft,
including a third friction clutch located in a torque delivery path between the input shaft and sun gear of the third gear unit, the third clutch arranged in parallel with the first clutch and fourth overrunning coupling.

* * * * *